UNITED STATES PATENT OFFICE.

JONAS TOWER, OF MADISON, OHIO.

IMPROVEMENT IN THE PROCESS OF REDUCING IRON OR OTHER ORES TO THE METALLIC STATE BY COATING THEM WITH CERTAIN FLUXES.

Specification forming part of Letters Patent No. 3,850, dated December 7, 1844.

*To all whom it may concern:*

Be it known that I, JONAS TOWER, of Madison, in the county of Lake and State of Ohio, have discovered or invented and applied since the 16th day of June, A. D. 1844, at Port Henry, county of Essex, and State of New York, a new and Improved Mode of Preparing, Applying, and Using Certain Fluxes for the Reduction of Ores or Minerals in Blast-Furnaces; and I do hereby declare the following is as full and exact a description as can conveniently be given of it.

The nature of my discovery or invention consists in reducing marl or clay or lime or any other earth or mineral that is dissoluble or diffusible and will form a pap, paste, or grout with water or other liquids, and applying the same to the ores or minerals intended to be used so as to form a complete coating or envelope to protect the same from the action of the blast or combination of oxygen with the iron or mineral in a melting state. It also serves to adhere the particles of ore or mineral together, so that they will not have a tendency to run down through the coal or fuel and form masses impervious to the heat and blast, and diffuses the ore or mineral more equally through the mass of coal or fuel in the furnace. It is also very useful in cases where ores are too rich in iron to work well into cast-iron in blast-furnaces. By reducing the percentage of rich ores sufficiently with the preparation herein described it works as well, or nearly so, into cast-iron as leaner ores in blast-furnaces.

To enable others skilled in the art of iron-making or smelting ores to use my invention or discovery, I will proceed to describe the mode of preparing and using the same.

I take lime or marl or clay or any other substance, such as is best adapted to flux the ores or minerals intended to be used, (and which substance is dissoluble or diffusible and will form a paste, pap, or grout with water,) and put the same in some vessel with water and reduce it to such paste, pap, or grout by stirring or grinding by hand or machinery until it is perfectly even and soft and of a creamy consistence, or similar to the molasses of commerce. Then I spread my ore (which, if of iron, is of the magnetic or other rich ores, and is liable to become too fine in the pounding operation) upon a floor and pour the grout, pap, or paste upon it in a sufficient quantity to form a complete coating for the particles of ore or minerals intended to be mixed, and with a shovel or other instrument adapted to the purpose stir it about until it is intimately mixed and the particles completely enveloped with the pap, paste, or grout. It may then be used, or it may lie a day or two to dry, which is better, or it may be put in an oven or other place and heat applied to dry it, which is still better, care being taken not to pulverize it too fine when drying, as that would counteract the effect intended in wetting and mixing it. It is then to be used in the usual way of using ores or minerals in a blast or other furnace, the furnace being constructed the same as for using ores or minerals prepared in the usual way.

The benefits derived from the above preparation consist, first, in causing the particles to adhere together, so that they will not run ahead of the coal and form large masses impervious to the heat and blast, (which is apt to be the case with unprepared ores,) in which state it causes the furnace to work "raw" or "cold," as it is termed by workmen; secondly, it protects the ore or mineral from the action of the blast or combination of oxygen with the metal by forming a coating of cinder or slag which covers the particles of mineral or ore in a melting state; otherwise the oxygen and metal or mineral combine and form an oxide or black slag, which runs off, and the metal does not separate entirely from it, and of course is lost, and causes what iron the furnace does make to be of an inferior quality, whereas in using the mixture the coating formed by the grout protects the iron or mineral from the oxygen or blast and causes a complete separation of the iron or metal from the slag, the iron being of a superior quality and the saving immense; thirdly, it is very useful in cases where ores are too rich in iron to work well into cast-iron in blast-furnaces. By sufficiently reducing the percentage of such ores they work as well, or nearly so, as ores of a leaner kind.

I do not claim any special right to the use of the above fluxes in a dry or natural state. It is only after they have been mixed or diffused with water or other liquids and formed into a paste, pap, or grout and applied as a coating or adhering substance, as herein described, that I claim as my invention or discovery and desire to secure by Letters Patent.

What I claim as my invention or discovery, and desire to secure by Letters Patent, is—

1. The application of those earths or minerals which are dissoluble or diffusible with water and have an adhesive nature and can be made into a paste, pap, or grout with the above or other liquids, and can be applied as fluxes for the reduction of ores or minerals in blast or other furnaces.

2. The application of the above preparation, as herein described, to other minerals as well as iron which have a similar objectional tendency while smelting that is found with iron.

JONAS TOWER.

Witnesses:
J. E. McVINE,
B. F. HYDE.